United States Patent Office 2,975,155
Patented Mar. 14, 1961

2,975,155

RESIN-CURING AGENT SYSTEM

Nicholas J. Capron, Neshaminy, and Burton E. Lederman, Conshohocken, Pa., assignors to Pennsalt Chemicals Corporation, Philadelphia, Pa., a corporation of Pennsylvania No Drawing. Filed Jan. 30, 1958, Ser. No. 712,080

7 Claims. (Cl. 260—47)

This invention relates to chemically curable resinous compositions prepared from epoxy ethers and amine-type curing agents.

Epoxy ether resins, such as those prepared from the glycidyl ethers of bis-phenols, are widely used in the manufacture of varnishes, enamels, sealing liquids, casting and other molding compositions, cold solders, adhesives, impregnating compositions and the like. For these and other applications, the desired end products are obtained by reacting the epoxy ether in the uncured state with a so-called curing agent which converts the resin into a thermo-set, or cross-linked solid.

One of the features that makes epoxy resin compositions attractive in many applications is their ability to be cured at ambient temperatures without application of external heat. This is of great advantage, for example, in making castings in that it eliminates the necessity for heating the usually cumbersome mold together with the casting which it contains. Instead, the casting may be poured into a mold, merely stored at room temperature for a relatively short period of 24 hours, for example, after which the casting may be used without further treatment or subjected to a post-cure at a higher temperature. In the latter case, the heat treatment is a comparatively simple operation since it is carried out after the casting has been removed from the mold, thus requiring less oven space and shorter curing times.

Not all epoxy resin curing agents are capable of providing relatively rapid and satisfactory ambient temperature cures. Many curing agents, such as organic acids and organic acid anhydrides and certain types of amines such as phenylene diamine, will not cure satisfactorily at room temperature and in fact may require relatively prolonged baking to provide adequate cures.

Of the epoxy resin curing agents which have found commercial use to any extent, only the polyamides (reaction products of polymerized fatty acids with polyamines), the aliphatic polyamines, and more recently, certain adducts of polyamines, have achieved recognition as ambient temperature curing agents of good utility. The polyamides are effective curing agents when used in high proportion such as 50 parts per hundred parts of resin, but are rather inconvenient to incorporate because of their high viscosity and poor compatibility at normal ambient temperatures. The aliphatic polyamines, such as diethylene triamine, triethylene tetramine, etc., are quite satisfactory in many respects, so far as their curing properties are concerned. They provide rapid, ambient temperature cures and produce cured products having good properties. They have, however, a serious drawback, namely, high toxicity. Their toxicity is most commonly evidenced in the form of skin rashes and other forms of skin irritation suffered by the workers who come in contact with the liquid amine itself or its vapors. Since the amine curing agent must be formulated with the resin just prior to use in relatively small batches, the amines must necessarily be handled frequently, thus making it difficult to control the hazard. Recently it has been proposed to modify the aliphatic polyamines to reduce their toxicity by condensing them with ethylene oxide, for example, to produce adducts such as monohydroxyethyl diethylenetriamine or bishydroxyethyl diethylenetriamine. With the first-named adduct, the problem of toxicity is not completely eliminated. With the second, the bishydroxyethyl derivative, the toxicity reduction is better, but the properties of the cured resin are often rather poor. In each instance the viscosity of the adduct is much higher than that of the polyamine, which in turn imparts undesirably high viscosities to the adduct-resin mixtures. High viscosity is usually undesirable in that it increases the difficulty of blending the curing agent with the resin, and in the case of the resin-curing agent system, it increases the difficulties of handling the resin particularly in casting operations, where good flow and ease of release of entrapped air are desired.

Many tertiary amines, for example, triethylamine and benzyldimethylamine, are capable of curing epoxy resins, presumably by catalyzing the opening of the epoxy rings, but generally the cures are extremely slow and often incomplete unless heat is applied. In fact, the only tertiary type amine which has attained commercial acceptance as an ambient temperature curing agent is tris-2,4,6-dimethylaminomethyl phenol, a product which is quite unstable and must accordingly be stored at low temperature.

It has now been found, in accordance with the present invention, that mixtures of certain tertiary amino alcohols, namely mixtures of dimethylamino ethanol $$((CH_3)_2N—CH_2CH_2OH)$$

and diethylaminoethanol 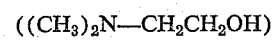, provide curing agents for epoxy ether resins which not only have very low toxicity, but also promote fast cures at ambient temperatures without application of external heat to provide cured products having good physical and chemical properties. In addition to the above advantages, such mixtures have the very desirable feature of greatly lowering the initial viscosity of the epoxy ether resin, thus rendering the resin-curing agent system more amenable to casting operations. Still a further advantage of the aforesaid mixtures is that, unlike the polyamines and most other curing agents, the amount incorporated with the resin is not critical, but may be varied over a considerable range without detracting appreciably from the properties of the cured resin.

The resin-curing agent system of the invention is particularly advantageous when applied to casting, molding, potting, encapsulation, and related operations. As will be explained in more detail hereinafter, the extent of the exotherm attained during the curing operation (exotherm being the maximum temperature reached at the center of the resin mass during curing) may be controlled readily by suitable adjustment of the ratio of one component to the other in the amine mixture.

The results obtained by the use of the mixture of dimethylaminoethanol and diethylaminoethanol cannot be obtained by the use of either one of these amines alone as will be shown hereinafter. Apparently, in combination there is a kind of synergistic effect between the mixture of amino alcohols, giving a combination of properties which it is impossible to obtain with either one alone.

The ratios of the two amino alcohols in the mixture may vary quite widely. Generally, improved results are obtained over the use of either component alone when the ratio of dimethylaminoethanol to diethylaminoethanol by weight is in the range of from 90:10 to 10:90. For the majority of applications, the best overall results can be obtained when the weight ratio of the two amino alcohols is of the order 30:70 to 70:30.

Epoxy ethers suitable for use in the compositions of the invention comprise those having a 1,2-epoxy equivalency greater than 1. By epoxy equivalency is meant the average number of 1,2-epoxy groups:

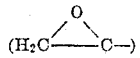

per molecule of the epoxy ether. Such ethers will cure by reacting with the amine curing agents of the invention to produce cross-linked, thermo-set solids of high molecular weight. Where one specific epoxy ether is involved in contrast to a mixture of ethers, the epoxy equivalency will be an integer. Thus, the epoxy equivalency of a specific compound such as the diglycidyl ether of bis(4-hydroxyphenyl)-2,2-propane is two while that of the triglycidyl ether of a glycerol is three. Inasmuch as commercial epoxy ethers are usually mixtures of a number of specific ethers of different molecular weights, the epoxy equivalency is necessarily in such cases an average value, and is unlikely to be an integer. An epoxy equivalency of 1.32, for example, means that there are an average of 1.32 epoxy groups per molecule of the epoxy ethers present in the mixture.

The epoxy equivalency is determined by dividing the measured average molecular weight by the epoxide equivalent weight. The "epoxide equivalent weight" is the weight of the epoxy ether which contains one equivalent weight of a 1,2-epoxy group. It is determined by reacting a known quantity of the epoxy ether with a known quantity of hydrochloric acid and back-titrating the remaining acid to determine its consumption. The usual procedure is to heat a weighed sample of the epoxy ether with an excess of 0.2 N pyridinium chloride in chloroform solution at the boiling point under reflux for two hours whereby the pyridinium chloride quantitatively hydrochlorinates the epoxy groups to chlorhydrin groups. After cooling, the excess pyridinium chloride is back-titrated with 0.1 N sodium hydroxide in methanol to the phenolphthalein end point. The epoxide equivalent weight is calculated by considering that each molecule of consumed HCl from the pyridinium chloride combines with an epoxy group.

Suitable epoxy ethers include, for example, monoethers such as diglycidyl ether or di(2-methylglycidyl)ether but more preferably polyethers such as the 1,2-epoxy-containing polyethers of polyhydric alcohols (i.e., alcohols containing at least two alcoholic OH groups) or of polyhydric phenols (phenols containing at least two OH groups attached to a nuclear carbon atom). Suitable polyethers of polyhydric alcohols include the polyglycidyl polyethers of ethylene glycol, trimethylene glycol, butylene glycol, dipropylene glycol, glycerol, diglycerol, erythritol, pentaglycerol, pentaerythritol, mannitol, sorbitol, polyallyl alcohol, polyvinyl alcohol, inositol, p-xylylene glycol, etc. These polyglycidyl polyethers may be prepared according to well-known methods, such as by reacting the polyhydric alcohol with epichlorhydrin in the presence of .1% to 5% by weight of an acid acting compound, such as boron trifluoride, hydrofluoric acid or stannic chloride to form the chlorhydrin ether. The reaction is effected at about 50° C. to 125° C. using the reactants in such proportions that there is one mol of epichlorhydrin for every equivalent of hydroxyl group in the polyhydric alcohol. The chlorhydrin ether is then dehydrochlorinated by heating at about 50° C. to 125° C. with a small stoichiometrical excess (e.g., 10%) of a base such as sodium aluminate.

Suitable polyethers of polyhydric phenols include, for example, the polyglycidyl polyethers of dihydric phenols, including mononuclear phenols such as resorcinol, catechol, hydroquinone and methyl resorcinol and polynuclear phenols such as 4,4'-dihydroxy benzophenone, 1,5- dihydroxy naphthalene and particularly the alkylene bisphenols such as 2,2-bis(4-hydroxyphenyl) propane, 1,1-bis(4-hydroxyphenyl) propane, 1,1-bis(4-hydroxyphenyl) isobutane, 2,2-bis(4-hydroxyphenyl) butane, 2,2-bis(4-hydroxy-2-methylphenyl) propane, 1,1-bis(4-hydroxyphenyl)-2-methyl propane, 3,3-bis(4-hydroxyphenyl)pentane, 1,1-bis(4-hydroxyphenyl)-2-ethyl hexane, and bis(4-hydroxyphenyl) methane.

The glycidyl ethers of the polyhydric phenols may be prepared according to well-known methods. For example, the glycidyl ethers of the dihydric phenols may be prepared by reacting the dihydric phenol with epichlorhydrin at 50° C. to 150° C. using a molar excess of the epichlorhydrin in the presence of a base such as KOH, NaOH, Ca(OH)₂, the base being usually employed in slight stoichiometric excess of the epichlorhydrin. The usually complex mixture of products from such reaction may be generally represented by the formula:

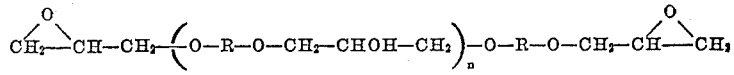

where R represents a divalent hydrocarbon radical of the dihydric phenol and where $n$ is an integer of the series 0, 1, 2, 3, etc. The average length of the chain enclosed in the parentheses can be varied by changing the molar ratio of epichlorhydrin to dihydric phenol. Generally as the molar ratio of epichlorhydrin to dihydric phenol is decreased from 2:1 toward 1:1 the average value of $n$ increases, increasing the softening temperature of the resulting product.

Preferably, the epoxy ethers employed in the compositions of the invention contain only carbon, oxygen, hydrogen and halogen atoms. However, other epoxy ethers may also be employed if desired as the glycidyl ethers of polyhydric thio ethers such as 2,2'-dihydroxy diethyl sulfide, or the glycidyl ethers of thio alcohols such as alpha-monothioglycerol.

Particularly preferred in the practice of the present invention are the polyglycidyl polyethers of alkylene bisphenols (such as the commonly employed 2,2-bis(4-hydroxy phenyl) propane) having molecular weights ranging from about 350 to 800 and epoxide equivalent weights ranging from about 175 to 400.

The amount of curing agent to be employed in the resin-curing agent system of the invention will depend to some extent upon the particular resin used. As is well known in the art, the optimum amount of curing agent in any particular system is usually best determined by empirical methods, and this is particularly true of tertiary amines In the case of the polyglycidyl polyethers of the alkylene bisphenols, the proper amount of the curing agent blend of the invention will generally be found to lie in the range of from 6 to 20 parts per hundred by weight of the resin, and in most cases the optimum amount will lie in the range of from 8 to 12 parts per hundred by weight of the resin.

As is generally known, it is usually not desirable to use a substantial excess of an aliphatic polyamine curing agent since the free amine groups present in the cured resin have a detrimental effect upon its chemical resistance, particularly with respect to its water, acid, and solvent susceptibility. It has been found, however, that considerable excesses of the tertiary amino alcohol mixture of the invention over the minimum effective amount does not have this tendency to produce undesirable properties. This permits more flexibility in choosing the resin:curing agent ratio. This is of considerable practical advantage in mitigating the necessity for painstaking proportioning of the resin and curing agent. Of equal importance is the fact that in the resin-curing agent system of the invention, the viscosity of the mix may be controlled by varying within relatively wide limits the amount of curing agent employed. This affords a wide latitude of viscosities, not ordinarily obtainable, since the amino alcohols themselves are good viscosity reducers and the lack of sensitivity of the system to an excess of these agents permits still further reduction in viscosity, if desired.

EXAMPLES

Casting formulations were made up as follows:

| | Example | | | | | |
|---|---|---|---|---|---|---|
| | 1 | 2 | 3 | 4 | 5 | 6 |
| Epon resin 828 (parts by weight) | 100 | 100 | 100 | 100 | 100 | 100 |
| Dimethylaminoethanol | 5.6 | 4.8 | 4 | 2.4 | 8 | 0 |
| Diethylaminoethanol | 2.4 | 3.2 | 4 | 5.6 | 0 | 8 |

Epon resin 828 is an epoxy ether resin manufactured by the Shell Chemical Corporation, prepared by reacting 2,2-bis(4-hydroxyphenyl) propane with epichlorhydrin. It has an average molecular weight of about 400, a softening point of about 8–12° C. (by Durrans' mercury method), a specific gravity of 1.2, and an epoxy equivalency of about 1.85. It may be prepared, for example, according to the procedure described for the preparation of "polyether A" in U.S. Patent 2,643,239.

A series of castings were made with the above formulations at a temperature of approximately 25° C. All castings were permitted to cure for 24 hours at this temperature except the Example 6 formulation containing only diethylaminoethanol as the curing agent, which required a week to set up sufficiently so that it could be removed from the mold. The castings then were subjected to a post cure of 3 hours at a temperature of 100° C.

After the castings were cured they were tested to determine their heat distortion temperature (according to the ASTM method No. 648-56), water absorption (by immersion in boiling distilled water for 24 hours) and acetone absorption (by immersion in acetone at reflux temperature for 3 hours). The results of these tests are as follows:

| Example | Ratio of Dimethylaminoethanol to Diethylaminoethanol | Setting Time at 25° C. | Heat Distortion Temp., ° C. | H₂O Absorption | Acetone Absorption |
|---|---|---|---|---|---|
| 1 | 70:30 | 24 hrs | 82 | 1.0 | 1.5 |
| 2 | 60:40 | 24 hrs | 86 | 0.9 | 1.1 |
| 3 | 50:50 | 24 hrs | 89 | 0.7 | 0.7 |
| 4 | 30:70 | 24 hrs | 89 | 0.7 | 0.5 |
| 5 | 8:0 | 24 hrs | 79 | 1.9 | 2.1 |
| 6 | 0:8 | 1 week | 87 | 0.7 | 0.8 |

As may be seen from the data in the preceding table, the mixtures of dimethylaminoethanol and diethylaminoethanol cured the resin sufficiently at room temperature in less than 24 hours so that it could be removed from the mold, and furthermore produced good ultimate properties in the cured resin, optimum properties being produced at dimethylaminoethanol:diethylaminoethanol ratios between about 30:70 and 50:50.

The dimethylaminoethanol used alone produced a rapid cure at room temperature, but the ultimate properties of the cured resin are undesirably poor as shown by a relatively low heat distortion temperature, and relatively high susceptibility to attack by water and acetone. The casting in which diethylaminoethanol was used alone required a week for the resin to set up hard enough in the mold so that the casting could be removed. On post curing at a temperature of 100° C., the casting showed good properties, approximating those obtained by the use of the mixtures, but diethylaminoethanol used alone has no utility as an ambient temperature curing agent because of the extreme slowness with which it sets the resin. It is only when the mixtures are employed that the combination of sufficiently rapid room temperature curing and good ultimate properties are obtained.

The best ultimate properties together with good room temperature curing action is generally obtained when the dimethylaminoethanol:diethylaminoethanol ratio is of the order of 50:50 or lower. If more rapid setting is desired, at some sacrifice in ultimate properties, higher ratios may be employed. If, on the other hand, somewhat slower room temperature curing action is permissible or desired, lower ratios may be employed.

Variation of the dimethylaminoethanol : diethylaminoethanol ratio can also be used advantageously to control the maximum exotherm in the resin mass during the ambient temperature cure. The maximum exotherm is defined as the highest temperature reached in the center of the resin mass during the cure as a result of the heat released by the curing reaction and is determined by inserting a thermometer into the center of the mass and noting the maximum temperature reached. Because of the poor thermal conductivity of the resin, larger resin masses tend to produce higher maximum exotherms, and in some cases, as with large castings, excessively high exotherms may be obtained, sufficient to cause charring, checking, or excessive shrinkage of the resin mass. In such cases it becomes desirable to reduce the exotherm. In other cases if the resin mass is of a small cross-section and can readily lose heat to its surroundings, the exotherm might in some cases be undesirably low. Some exotherm is often desirable since increased temperature speeds up the curing action.

By using the aminoethanol mixtures of the invention, the exotherm can be readily controlled in any particular case by regulating the dimethylaminoethanol : diethylaminoethanol weight ratio. In general, higher ratios will produce higher exotherms under a given set of conditions, while the lower ratios will produce lower or no measurable exotherm. This is illustrated by the following table which shows the exotherms measured when curing an epoxy ether resin (Epon resin 828 described above), making castings in the form of cubes, the castings varying in size from 250 grams to 50 grams. The curing agent employed in each case was a mixture of dimethylaminoethanol and diethylaminoethanol in the weight ratios indicated in the table.

| Ratio of Dimethylaminoethanol to Diethylaminoethanol | Parts by Weight of Aminoethanol Mixture per 100 Parts of Resin | Maximum Exotherm, ° C., at 25° C., Mass of Resin in Grams | | |
|---|---|---|---|---|
| | | 250 | 100 | 50 |
| 80:20 | 8 | | 175 | 165. |
| 70:30 | 8 | 185 | 160 | 140. |
| 60:40 | 8 | 170 | 70 | No exotherm. |
| 50:50 | 8 | 155 | No exotherm | Do. |
| 30:70 | 8 | No exotherm | do | Do. |

As may be seen from the above table, the higher dimethylaminoethanol : diethylaminoethanol ratios gave the highest exotherms, while a progressive decrease in the exotherm resulted as this ratio decreased.

It is to be understood that the above examples are given only by way of illustrating the invention and that the scope of the invention is not to be limited thereby nor in any way except in accordance with the scope of the appended claims.

We claim:
1. A composition comprising an epoxy ether resin having a 1,2-epoxy equivalency greater than 1 selected from the class consisting of polyglycidyl ethers of polyhydric phenols and polyhydric alcohols and a curing agent comprising a mixture of dimethylaminoethanol and diethylaminoethanol in which the weight ratio of dimethylaminoethanol : diethylaminoethanol is in the range of from 90:10 to 10:90.

2. A composition in accordance with claim 1 in which the weight ratio of dimethylaminoethanol : diethylaminoethanol is in the range of from 70:30 to 30:70.

3. A composition comprising an epoxy ether resin consisting of a polyglycidyl polyether of a dihydric phenol, and a curing agent comprising a mixture of dimethylaminoethanol and diethylaminoethanol in which the weight ratio of dimethylaminoethanol : diethylaminoethanol is in the range of from 90:10 to 10:90.

4. A composition in accordance with claim 3 in which the weight ratio of dimethylaminoethanol : diethylaminoethanol is in the range of from 70:30 to 30:70.

5. A method of making castings of epoxy ether resins having a 1,2-epoxy equivalency greater than 1 selected from the class consisting of polyglycidyl ethers of polyhydric phenols and polyhydric alcohols, comprising the steps of mixing said resin with a curing agent comprising a mixture of dimethylaminoethanol and diethylaminoethanol in which the weight ratio of dimethylaminoethanol : diethylaminoethanol is in the range of from 90:10 to 10:90, casting the resultant mixture, and permitting said mixture to cure without application of external heat.

6. A method in accordance with claim 5 in which said castings are subjected to a post cure at an elevated temperature following said cure in the absence of applied heat.

7. The method of claim 5 in which said epoxy ether resin is a polyglycidyl polyether of a dihydric phenol.

References Cited in the file of this patent

UNITED STATES PATENTS 2,723,241    De Groote et al. _____ Nov. 8, 1955